United States Patent [19]

Olson

[11] Patent Number: 5,921,699
[45] Date of Patent: Jul. 13, 1999

[54] DRAW PIN ASSEMBLY

[76] Inventor: Brian R. Olson, 3018 Gordon Road, Regina, Saskatchewan, Canada, S4S 218

[ * ] Notice: This patent is subject to a terminal disclaimer.

[21] Appl. No.: 09/008,086

[22] Filed: Jan. 16, 1998

Related U.S. Application Data

[63] Continuation-in-part of application No. 08/490,232, Jun. 14, 1995., Pat. No. 5,769,559

[51] Int. Cl.⁶ ........................................ B60D 1/02
[52] U.S. Cl. .................... 403/322.1; 403/12; 403/319; 280/509; 280/515
[58] Field of Search ............................ 403/321, 322.1, 403/324, 326, 318, 319, 12, 316; 280/508, 509, 515; 172/396, 677, 679

[56] References Cited

U.S. PATENT DOCUMENTS

| 1,837,940 | 12/1931 | Ade | 280/508 |
|---|---|---|---|
| 2,442,439 | 6/1948 | Schultz | 280/477 |
| 2,478,736 | 8/1949 | Balzer | 280/515 X |
| 2,556,748 | 6/1951 | Buckley | 280/515 X |
| 4,073,507 | 2/1978 | Dingess | 280/508 |
| 4,311,244 | 1/1982 | Hindin et al. | 280/515 X |
| 4,579,365 | 4/1986 | Breu | 280/515 X |
| 5,769,559 | 6/1998 | Olson | 403/322.1 |

FOREIGN PATENT DOCUMENTS

| 1228381 | 10/1987 | Canada . | |
|---|---|---|---|
| 490019 | 6/1992 | European Pat. Off. | 280/515 |
| 578073 | 1/1994 | European Pat. Off. | 280/515 |
| 636427 | 9/1936 | Germany | 280/508 |
| 639396 | 11/1936 | Germany | 280/508 |
| 175469 | 5/1970 | Germany | 280/508 |
| 173359 | 12/1982 | Germany | 280/508 |

*Primary Examiner*—Harry C. Kim
*Attorney, Agent, or Firm*—Murray E. Thrift; Aorian D. Battison

[57] ABSTRACT

A draw pin assembly includes a hammer strap that mounts on the drawbar and a draw pin that extends through aligned draw pin holes in the hammer strap and drawbar. A latch mechanism supports the draw pin in a retracted position while a trigger in the hitch-receiving space of the assembly releases the latch when a towed implement hitch comes into the proper alignment with the draw pin. An automatic locking mechanism is used to lock the draw pin against inadvertent release. The latch and locking functions are provided by a loop type handle connected to the draw pin. This eliminates elements projecting above the hammer strap to maximize the clearance for a tractor power takeoff.

8 Claims, 2 Drawing Sheets

DRAW PIN ASSEMBLY

CROSS REFERENCE TO RELATED APPLICATIONS

This application is a continuation-in-part of application Ser. No. 08/490,232, filed Jun. 14, 1995, now U.S. Pat. No. 5,769,559.

FIELD OF THE INVENTION

The present invention relates to vehicle couplings, especially of the agricultural draw pin type.

BACKGROUND

The current trend in drawbar design is to use a hammer strap on the drawbar to provide a clevis type connection to the tongue of the towed implement. This raises the height of the drawbar assembly to the extent that when the draw pin is installed, there may be insufficient clearance for the tractor power take off (PTO). This effect is augmented with any draw pin setting mechanism that extends above the hammer strap.

The present invention relates to a pin assembly in which interference with the tractor PTO is minimized or eliminated.

SUMMARY

According to the present invention there is provided a draw pin assembly including a hammer strap for mounting on top of a drawbar to provide a hitch-receiving space between the hammer strap and the drawbar, aligned draw pin holes in the hammer strap and the drawbar, and a draw pin with a set position in which the draw pin extends through the draw pin holes and a hitch in the hitch-receiving space, characterized in that:

the assembly includes a handle pivotally mounted on the draw pin adjacent a top end of the draw pin;

the hammer strap has a top side and includes a recess in the top side for receiving a portion of the handle adjacent the draw pin when the draw pin is in the set position;

the hammer strap has a lock seat below the top side of the hammer strap with which the handle may be engaged to prevent the draw pin from being forced out of the set position; and the handle is positioned below the top side of the hammer strap in the set position of the draw pin.

Because that part of the handle adjacent the draw pin is received in a recess in the top of the hammer strap when the draw pin is set, the assembly has a low profile extending only minimally above the top of the hammer strap. This provides the maximum clearance for the tractor PTO.

In the preferred embodiment of the assembly, the loop handle has a support position engaged with a cradle in the top of the hammer strap and supporting the draw pin in a retracted position.

BRIEF DESCRIPTION OF THE DRAWINGS

In the accompanying drawings, which illustrate exemplary embodiments of the invention.

DETAILED DESCRIPTION

Figure 1:
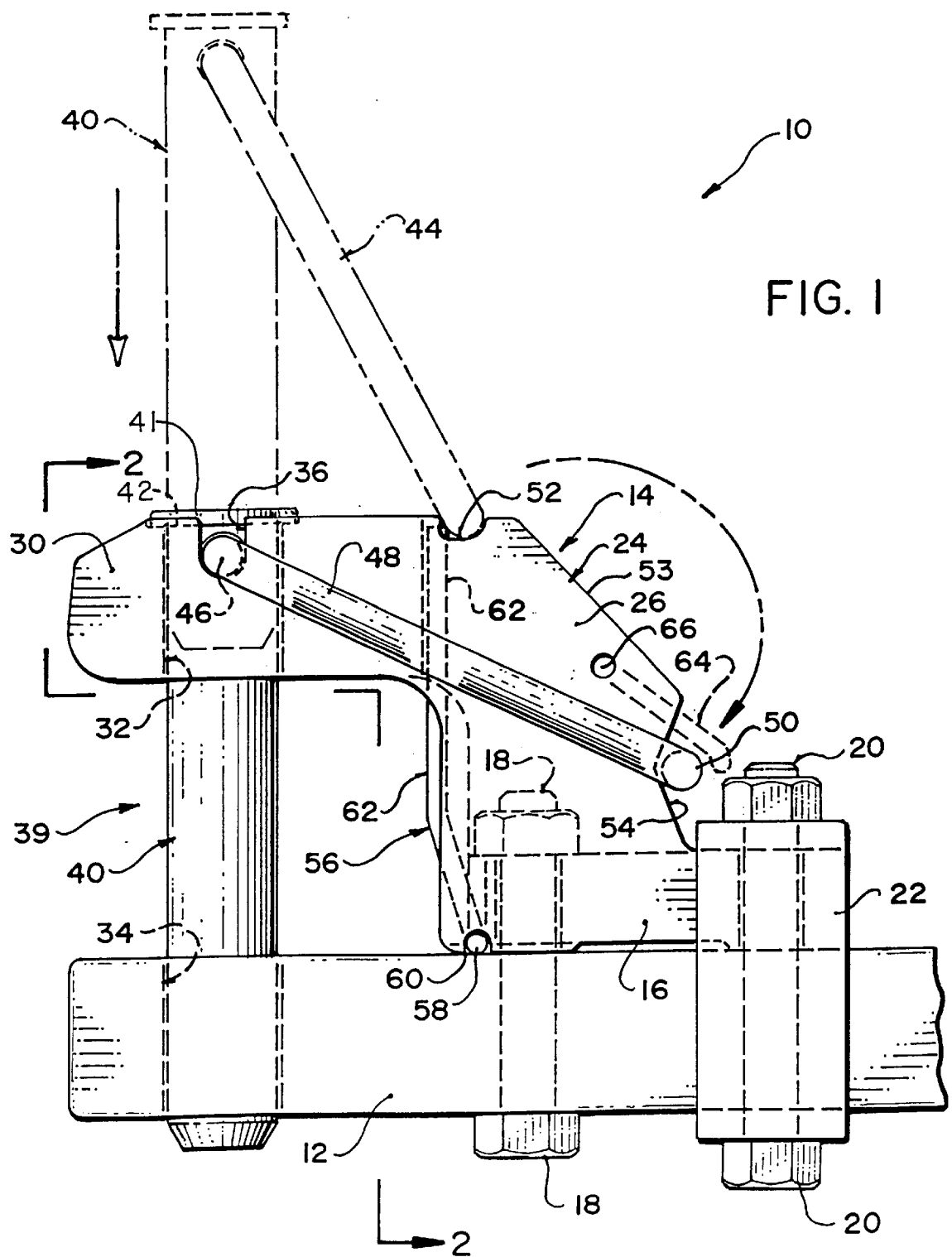
FIG. 1 is a side view an assembly according to the present invention.
Figure 2:
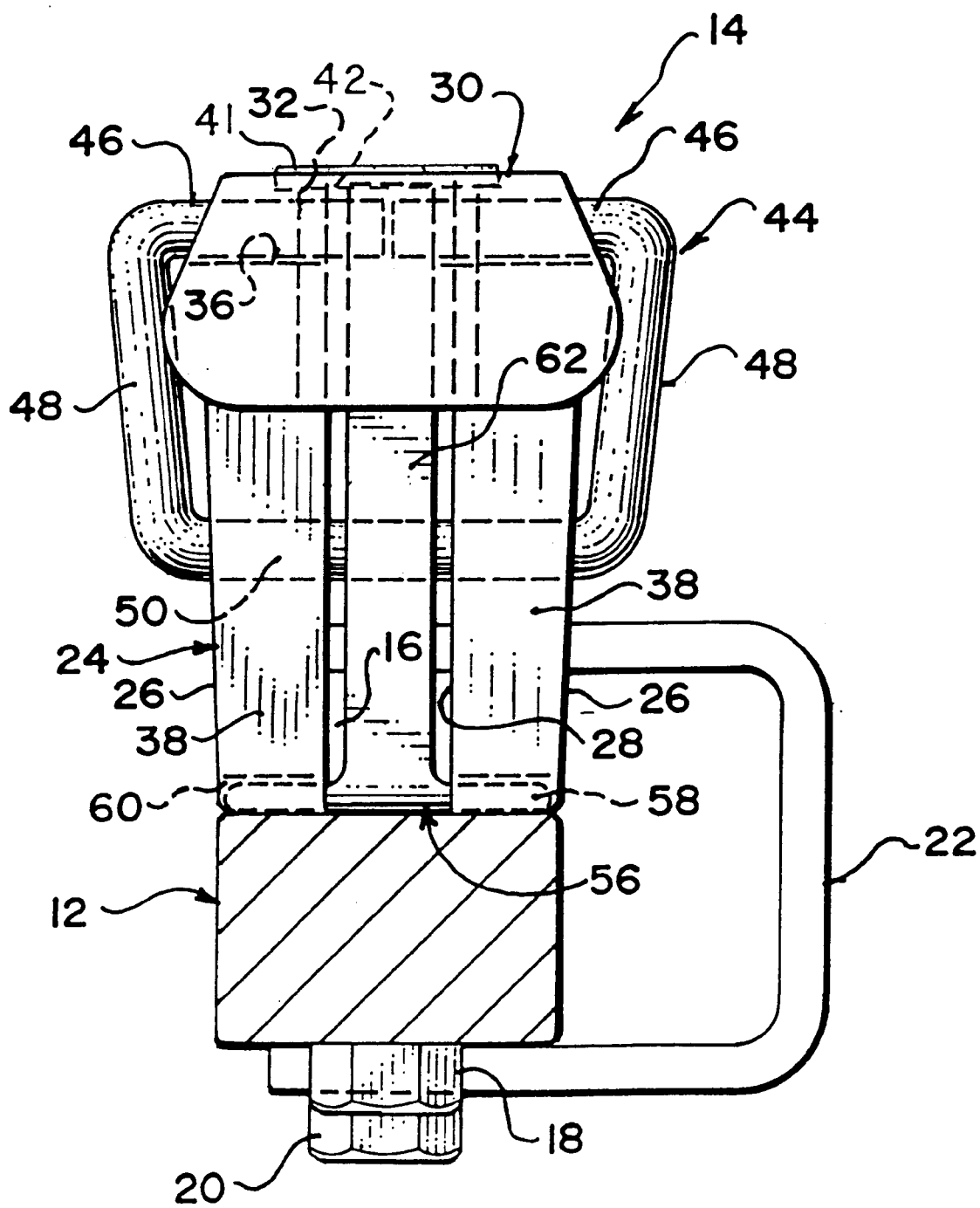
FIG. 2 is a view along line 2—2 of FIG. 3.

Referring to the accompanying drawings, there is illustrated a draw pin assembly 10 including a draw bar 12 of conventional form and a hammer strap 14 mounted on the drawbar. The hammer strap has a base section 16 that is fixed to the drawbar using two bolts 18 and 20. The bolt 20 is also used to fasten a C-shaped chain support 22 to the drawbar. An offset section 24 of the hammer strap projects upwardly from the base 16. It includes two side plates 26 separated by an open center zone 28. Extending from the offset section rearwardly over the drawbar is the arm 30 of the hammer strap that has a draw pin hole 32 aligned with the draw pin hole 34 of the drawbar. Across the top of the hammer strap, intersecting the draw pin hole 32 is a slot 36, the function of which will be described more fully in the following.

The front faces 38 of the side plates 26 converge towards the center to provide a "cup" for centering an implement hitch (not shown) entering into the space 39 between the drawbar and the hammer strap.

A draw pin 40 fits into the two draw pin holes 32 and 34. In the set position illustrated in solid lines in FIG. 1, the draw pin is recessed into the hammer strap with a flat, thin head 41 on the top end of the pin set into a recess 42 in the top of the hammer strap. This produces a minimal projection above the top face of the hammer strap. The draw pin is equipped with a loop type handle 44 with lateral sections 46 projecting diametrically from the draw pin, near the top end. The lateral sections merge into two arms 48 which in turn merge into opposite ends of a cross arm 50. The handle pivots freely on the draw pin, about the axis of the two lateral sections 46.

A cradle 52 is formed in the top of the hammer strap, forwardly from the draw pin hole. In the retracted position of the draw pin, shown in ghost lines in FIG. 1, the cross arm 50 engages in the cradle 52 so that the handle 44 will act as a latch member supporting the draw pin in the retracted position. Immediately forwardly from the cradle 52, the side plates of the hammer strap have surfaces 53 that slope downwardly and to the front. Below the sloping face 53 and above the base 14, each side plate has a lateral stop notch 54.

When the draw pin is in the set position, as illustrated in solid lines in FIG. 1, the handle falls into the stop notch 54. The lateral sections 46 of the handle engage in the slot 36 and support the draw pin in the set position. Any force tending to urge the draw pin up will pull the handle into the stop notch 54, preventing movement of the draw pin. To release the draw pin, the handle 44 is simply pivoted upwardly out of the stop notch and used to raise the draw pin.

The assembly 10 is equipped with a trigger 56. This is an inverted, T-shaped component with two base pins 58 extending across the top of the drawbar and retained in place by two grooves 60 immediately in front of the hitch-receiving space 39. The upright arm 62 slopes upwardly and into the hitch-receiving space 39 and extends up to the top of the hammer strap where it is seated between the two side plates 26, against the front of the arm 30. The top end of the trigger arm 62 extends into the cradle 52. When an implement hitch engages the trigger 56, it is pivoted to the front, dislodging the handle 44 from the cradle 52, so that the handle no longer supports the draw pin. The draw pin will then drop into place and the handle will slide down the front of the hammer strap into the stop notch 54.

In some instances it may be desired to ensure against inadvertent release of the handle from the stop notch. In such a case, a retainer 64 (FIG. 1) may be mounted on the hammer strap using lateral bores 66 in the side plates 26. When desired, this may be positioned to retain the handle in the stop notch. The retainer can be used if it is desired to mount the hammer strap on the bottom side of the drawbar.

To hook up, the tractor is backed up until the implement hitch aligns with the tractor hammer strap. This is facilitated by a cupped section 68 at the back end of the hammer strap which guides the implement hitch into proper alignment. The implement hitch will push back on the unlocking trigger 62, releasing the draw pin. The draw pin then drops into the space between the hammer strap and the draw bar. Depending on the size of the hole in the implement hitch, the draw pin will pass through the hitch and into the draw pin hole 34 in the draw bar, or it will remain partway set until the implement hitch is drawn slightly to the rear so that the implement hitch is fully aligned with the draw pin. When the draw pin sets fully, the handle 44 assumes the locked position, thus automatically locking the coupling.

While one particular embodiment of the invention has been described in the foregoing, it is to be understood that other embodiments are possible within the scope of the invention. The invention is to be construed as limited solely by the scope of the appended claims.

I claim:

1. A draw pin assembly including a hammer strap for mounting on top of a drawbar to provide a hitch-receiving space between the hammer strap and the drawbar, aligned draw pin holes in the hammer strap and the drawbar, and a draw pin with a set position in which the draw pin extends through the draw pin holes and a hitch in the hitch-receiving space, characterized in that:

the assembly includes a handle pivotally mounted on the draw pin adjacent a top end of the draw pin;

the hammer strap has a top side and includes a recess in the top side for receiving a portion of the handle adjacent the draw pin when the draw pin is in the set position;

the hammer strap has a lock seat below the top side of the hammer strap with which the handle may be engaged to prevent the draw pin from being forced out of the set position; and the handle is positioned below the top side of the hammer strap in the set position of the draw pin.

2. An assembly according to claim 1 wherein the handle is freely pivotable on the draw pin.

3. An assembly according to claim 2 including a handle retainer for retaining the handle in engagement with the lock seat.

4. An assembly according to claim 1 wherein the draw pin has a retracted position engaged in the draw pin hole in the hammer strap and clear of the hitch receiving space between the hammer strap and the draw bar, and the handle has a supporting position for supporting the draw pin in the retracted position and a released position releasing the draw pin to move into the set position.

5. An assembly according to claim 4 including a cradle in the hammer strap for engaging the handle in the supporting position of the handle to support the draw pin in the retracted position.

6. An assembly according to claim 1 wherein the handle is freely pivotable from engagement with the lock seat.

7. An assembly according to claim 4 including a flat head on the top end of the draw pin and a second recess in the top side of the hammer strap for receiving the head when the draw pin is in the set position.

8. An assembly according to claim 1 including a flat head on the top end of the draw pin and a second recess in the top side of the hammer strap for receiving the head when the draw pin is in the set position.

* * * * *